United States Patent [19]

Zalenski

[11] Patent Number: 4,807,166

[45] Date of Patent: Feb. 21, 1989

[54] METHOD AND APPARATUS FOR CALIBRATING AN ELECTRO-OPTICAL MOUSE

[75] Inventor: Thomas Zalenski, Killingworth, Conn.

[73] Assignee: Summagraphics Corporation, Fairfield, Conn.

[21] Appl. No.: 909,829

[22] Filed: Sep. 19, 1986

[51] Int. Cl.⁴ .............. G08C 21/00; G01C 25/00; G09G 3/02
[52] U.S. Cl. .................. 364/571.06; 178/18; 340/710; 250/221; 356/221; 341/31
[58] Field of Search .......... 364/571; 178/17 R, 18; 250/221; 73/1 R, 1 D; 340/707, 709, 710, 365 P; 356/221, 243, 432

[56] References Cited

U.S. PATENT DOCUMENTS

| | | | |
|---|---|---|---|
| 4,364,035 | 12/1982 | Kirsch | 340/710 |
| 4,390,873 | 6/1983 | Kirsch | 340/710 |
| 4,409,479 | 10/1983 | Sprague | 340/710 X |
| 4,521,772 | 6/1985 | Lyon | 340/710 |
| 4,550,250 | 10/1985 | Mueller et al. | 178/18 X |
| 4,631,675 | 12/1986 | Jacobsen et al. | 364/551 X |
| 4,707,689 | 11/1987 | DiPiazza et al. | 178/18 X |
| 4,710,758 | 12/1987 | Mussler et al. | 178/18 X |
| 4,710,759 | 12/1987 | Fitzgibbon | 178/18 X |

FOREIGN PATENT DOCUMENTS 8600447 1/1986 World Int. Prop. O. ....... 340/365 P

Primary Examiner—Parshotam S. Lall
Assistant Examiner—Joseph L. Dixon
Attorney, Agent, or Firm—Rosen, Dainow & Jacobs

[57] ABSTRACT

A method and apparatus for calibrating an electro-optical mouse during the detection of light reflected from a surface with optically contrasting indicia. The voltage output from the light detector is compared with stepped ramped sequences of reference voltage signals representing a count, the ramped sequence being stopped in response to each transition of the comparator between a first state where the amplitude of one of the input signals is less than that of the other and a second state where the amplitude of the one of the input signals is equal to or greater than the other. A processor determines the highest and lowest numbers at which any of the ramped sequences are stopped; and calculates at least one threshold value in dependence on the difference between the highest and lowest numbers.

12 Claims, 8 Drawing Sheets

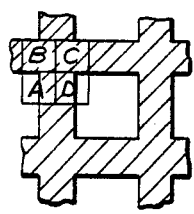 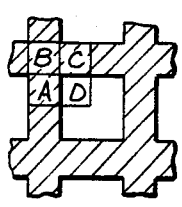 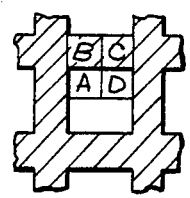 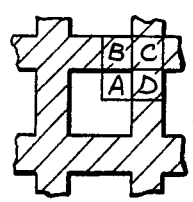
FIG. 6a    FIG. 6b    FIG. 6c    FIG. 6d
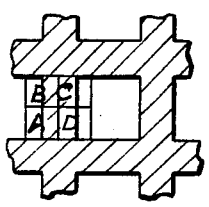 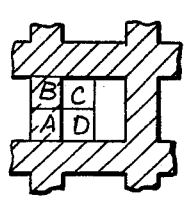 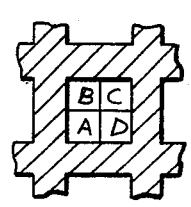 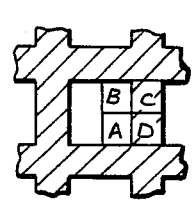
FIG. 6e    FIG. 6f    FIG. 6g    FIG. 6h
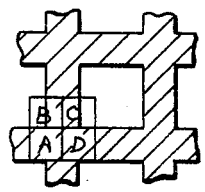 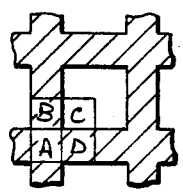 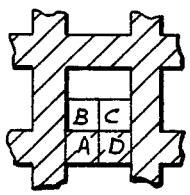 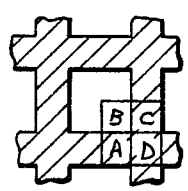
FIG. 6i    FIG. 6j    FIG. 6k    FIG. 6l
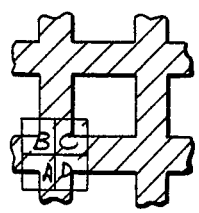 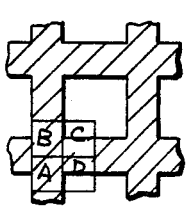 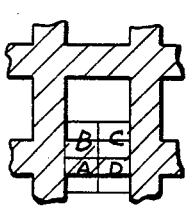 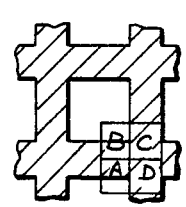
FIG. 6m    FIG. 6n    FIG. 6p    FIG. 6q
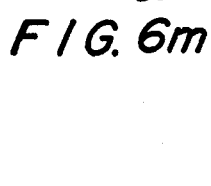

METHOD AND APPARATUS FOR CALIBRATING AN ELECTRO-OPTICAL MOUSE

TECHNICAL FIELD

The present invention relates to the field of controlling the movement of a cursor on a cathode ray tube. In particular, it relates to a method and an apparatus for calibrating an electro-optical transducer, i.e. mouse.

BACKGROUND OF THE INVENTION

Prior art electro-optical mice are disclosed in U.S. Pat. Nos. 4,364,035, 4,390,873 and 4,546,347 to Kirsch, U.S. Pat. No. 4,409,479 to Sprague et al., U.S. Pat. No. 4,521,772 to Lyon, and U.S. Pat. No. 4,543,571 to Bilbrey et al. All of these references disclose the detection of incremental movement by detecting when the intensity of light reflected from a grid comprising repetitive indicia crossed a threshold intensity level. However, none of these prior art references discloses the manner in which the value of this threshold intensity level is calibrated in relation to the range of possible intensity levels detected.

Although U.S. Pat. No. 4,390,873 to Kirsch does not disclose a method of calibrating an electro-optical mouse, the Applicant is aware that the Kirsch mouse was calibrated using a technique wherein a threshold level is selected and then tested to determine the number of samples produced during mouse travel which had a reflected light intensity greater than the predetermined threshold level and the number of samples which had a reflected light intensity less than the predetermined threshold level. This procedure would be repeated until a threshold level was selected which produced equal numbers of samples having reflected light intensities above and below the threshold level. This threshold level was then used to calibrate the mouse.

SUMMARY OF THE INVENTION

Accordingly, it is an object of the present invention to provide a method for automatically calibrating an optical mouse.

It is a further object of the present invention to provide such a method wherein a microprocessor performs the calibration in accordance with a calibration subroutine stored in memory.

It is a further object of the present invention to provide such a calibration method whereby the output level of the light source can be automatically adjusted to compensate for degraded performance with aging.

It is another object to provide a calibration method including the steps of taking a predetermined number of samples of the intensity level of light reflected from a grid to photodetecting means and processing these samples to determine the range of intensity levels.

It is another object to provide a calibration method whereby values corresponding to a plurality of threshold intensity levels dependent on the range of intensity levels are automatically stored.

It is a further object to provide a calibration method whereby errors in detecting a minimum or maximum intensity due to the lag in stopping the internal counter of the microprocessor following triggering of the comparators are compensated for.

Another object of the invention is to provide a calibration routine whereby the time required for carrying out the calibration is reduced.

In the electro-optical mouse in which the present invention is incorporated, a light source emits light at one of a plurality of light intensity levels, which emitted light is reflected from a reflective surface onto four photodetectors fixedly arranged in a square pattern inside the mouse. The light source and photodetectors are rigidly fixed inside the housing, which is movable over the reflective surface. The pattern on the reflective surface may be a grid of orthogonal or hexagonal lines or curvilinear segments (or a matrix of squares, hexagons, or circles, respectively). This pattern is optically imaged onto the four photodetectors by a lens such that the width of a line segment is optically magnified to substantially equal the distance between the centers of adjacent photodetectors. During movement of the housing, the magnified image of the illuminated pattern impinges on the four detectors. As a result of this impingement, the photodetectors sense the intensity of light reflected from the grid and generate voltage signals proportional to the changing intensity levels.

The voltage signals output by the photodetectors are input to four comparators. Each comparator also receives a threshold voltage from a digital-to-analog converter connected to the microprocessor. The threshold voltage is varied in accordance with a predetermined sequence of values during each sampling cycle. Each comparator outputs a predetermined binary digit if the voltage signal from the respective photodetector quadrant exceeds the threshold voltage being supplied. The preferred embodiment of the invention can determine whether the photodetector quadrant is receiving reflected light having an intensity level falling in one of four ranges. For each quadrant, the microprocessor receives a two-bit code indicating in which one of the four ranges the intensity level of the quadrant lies. The four two-bit codes form an eight-bit code which is hereinafter referred to as the intensity code. This eight-bit intensity code is then further processed to determine the position of the mouse relative to the grid pattern. In particular, the eight-bit intensity code is translated into a two-bit X code and a two-bit Y code representing the approximate location of the mouse relative to a single indicium of the respective grid pattern. These X and Y codes are then processed to obtain signals representing unit changes in mouse position in the X and/or Y directions. Distance information is obtained by counting signals representing unit changes as a function of direction. The X-Y distance and direction information is output to drive a cursor, the position of which is changed in response to the output information.

However, before this digitization process can be performed, the light-detecting arrangement must first be calibrated in order to enable proper setting of the threshold levels. The digital-to-analog converter is capable of outputting an analog voltage signal having one of 128 values. During the sampling procedure, the microprocessor provides a digital output to the digital-to-analog converter which is ramped in a stepped manner from 0 to 127 (the ascending ramp) N times and then is ramped in a stepped manner from 127 to 0 (the descending ramp) N times for each channel.

Thus, 8N samples are obtained, 2N for each channel. The microprocessor determines the maximum and minimum measured intensity values for each channel (i.e. $I_{max}$ and $I_{min}$). After each block of N samples, the corresponding stored $I_{max}$ and $I_{min}$ values are tested. If $I_{max}$ is greater than a pre-stored limiting value (i.e. $I_{max.lim}$), then the intensity level of the output of the light-emitting means is automatically decremented to the next lower level by the microprocessor. If $I_{min}$ is less than a prestored absolute minimum value (i.e. $I_{min.lim}$), then the intensity level of the output of the light-emitting means is automatically incremented to the next higher level. Then another sampling cycle of 8N samples is performed, 2N for each channel, which samples are respectively compared with the stored $I_{max}$ and $I_{min}$ values for each channel. The microprocessor then uses the final values for $I_{max}$ and $I_{min}$ to compute and store the threshold levels for each channel.

DETAILED DESCRIPTION OF THE DRAWINGS

The optical mouse of the present invention will be described in detail with reference to the following drawings:

FIGS. 6a to 6q are diagrammatic views of a portion of the grid of FIG. 3a, showing 16 positions of the photodetectors relative to the grid pattern, these positions corresponding to the 16 pre-stored combinations of X and Y codes.

DETAILED DESCRIPTION OF THE PREFERRED EMBODIMENT

Figure 1:
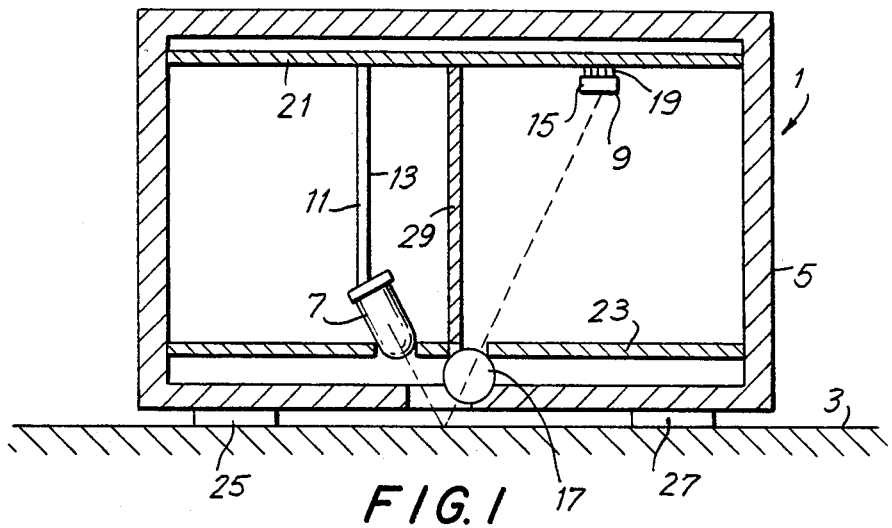
FIG. 1 is a side sectional view of one preferred embodiment of the electro-optical mouse in which the present invention is incorporated.

FIG. 1 shows the preferred embodiment of a position control system 1, movable over surface 3, in which the calibration arrangement of the invention is incorporated. The system 1 comprises a housing 5, a light source 7 and a detecting means 9. The light source 7 is powered through conductors 11 and 13. Detecting means 9 includes photo detector array 15, which receives light reflected from surface 3 and transmitted through imaging lens 17. Conductors 19 feed the signal from array 15. Light source 7 and detecting means 9 are each rigidly fixed relative to housing 5 by fastening means affixed to internal shelves 21 and 23.

Housing 5 is provided with low-friction spacers 25 and 27 which elevate the body of the housing, including lens 17 and detecting means 9, above surface 3 by the predetermined distance required to obtain proper focusing of reflected light o the photodetector array. Spacers 25 and 27 may be made of a material that will minimize wear of surface 3 and enable the housing 5 to slide easily over that surface.

In the illustrated embodiment source 7 is a light-emitting diode (LED). Light source 7 emits light that lies preferably in either the red or the infrared portions of the spectrum. Light shield 29 prevents light source 7 from illuminating detecting means 9 directly. Ideally, source 7 is mounted so that it is positioned close to surface 3. This will ensure that light emitted by source 7 will impinge on surface 3 at a relatively narrow spot with a higher light intensity than if positioned further away.

Figure 2:
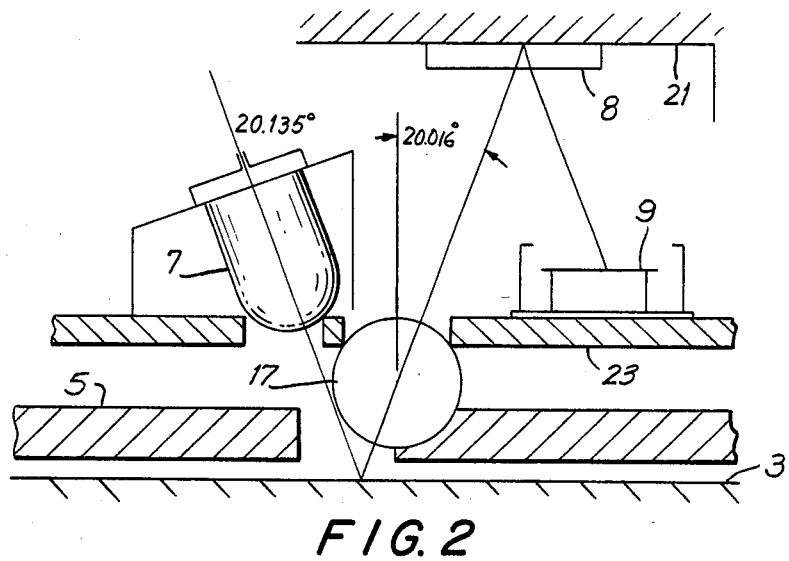
FIG. 2 is a side sectional view of another preferred embodiment of a mouse in which the invention is incorporated, showing an alternative arrangement of the optical elements.

An alternative preferred embodiment of the optical arrangement can be seen in FIG. 2. Similar elements have the same reference numerals in FIGS. 1 and 2. The embodiment depicted in FIG. 2 differs from that of FIG. 1 in that after the light reflected from surface 3 passes through lens 17, it is reflected toward the detecting means 9 by a mirror 8 attached to internal shelf 21.

The photodetector array 15 comprises four photodetectors, hereinafter referred to as detectors A through D inclusive. Photodetector array 15 may be a standard four-quadrant photodetector. As clearly shown in FIGS. 6, the detectors comprises the four quadrants of a square photodetector array. Each detector responds independently when radiant energy impinges on its surface area by outputting a voltage proportional to the intensity of the impinging radiant energy.

Figure 3A:
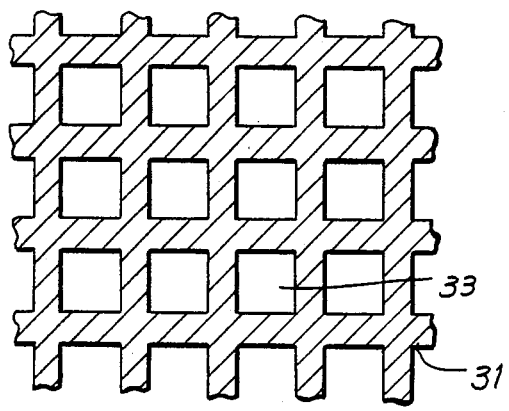
FIGS. 3a to 3c are views of portions of possible grid patterns for use with the present invention.
Figure 3B:
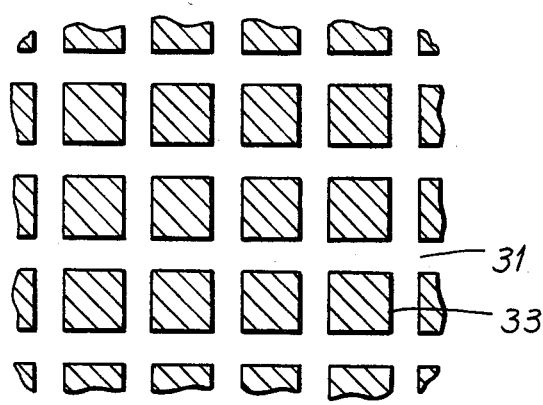
Figure 3C:
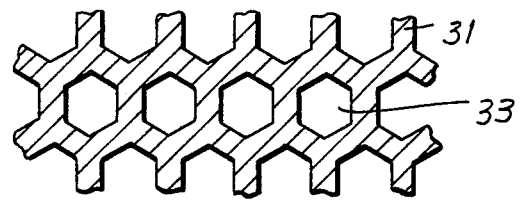

FIGS. 3a and 3b show two possible embodiments of the optically contrasting areas of surface 3. These optically contrasting areas can be applied through conventional printing techniques. Both line segments 31 and surface areas 33 can be made of ordinary materials but of contrasting colors. For example, white or light-colored paper having black line segments printed thereon is suitable. Also, white or light-colored paper having black surfaces printed thereon could be used (see FIG. 3c). Alternatively, a sheet of transparent photographic film with black line segments spaced thereon can be placed on a reflective surface. Obviously a sheet of transparent photographic film with black surface areas spaced therein could alternatively be placed on such a reflective surface. In all embodiments each line segment has a width equal to one arbitrary unit and each square area has sides with a length equal to two arbitrary units.

In the embodiment of FIG. 3b line segments 31 define hexagonal areas 33. As will be evident to one skilled in the art, many repetitive patterns are suitable and the two illustrated in FIGS. 3a and 3b are merely illustrative. Indeed, surface areas 33 may be circular.

When light is emitted by source 7 and reflected by surface 3, the optically contrasting pattern of segments 31 and surface areas 33 is optically imaged onto the detectors A through D of the photodetector array 15. The imaging lens 17 magnifies the image of the surface so that the width of a segment 31 is magnified to approximately equal the distance between centers of detector quadrants when the image impinges on the detector array 15. For example, if segments 31 have a width of 0.01 inch and the spacing between quadrant centers is 0.05 inch, then a magnification of 5X would be required In practice, when the photodetector 15 detects reflected radiant energy from the grid pattern 31, 33 of FIG. 3a, the photodetector "views" the pattern shown in FIG. 3d due to the fact that the optical lens is nonideal. In other words, the grid pattern of FIG. 3d represents the view as seen by the photodetector, whereas the grid pattern of FIG. 3a represents the view as seen by the human eye. In effect, the "view" of the grid pattern is distorted as the result of passage of the radiant energy through a non-ideal, i.e. degraded, lens. As discussed in detail in related U.S. patent application Ser. No. 860,231, which application is assigned to the assignee of this application, the optical mouse of the present invention is provided with tables of data which serve to compensate for this distortion, enabling accurate position determination.

Figure 5:
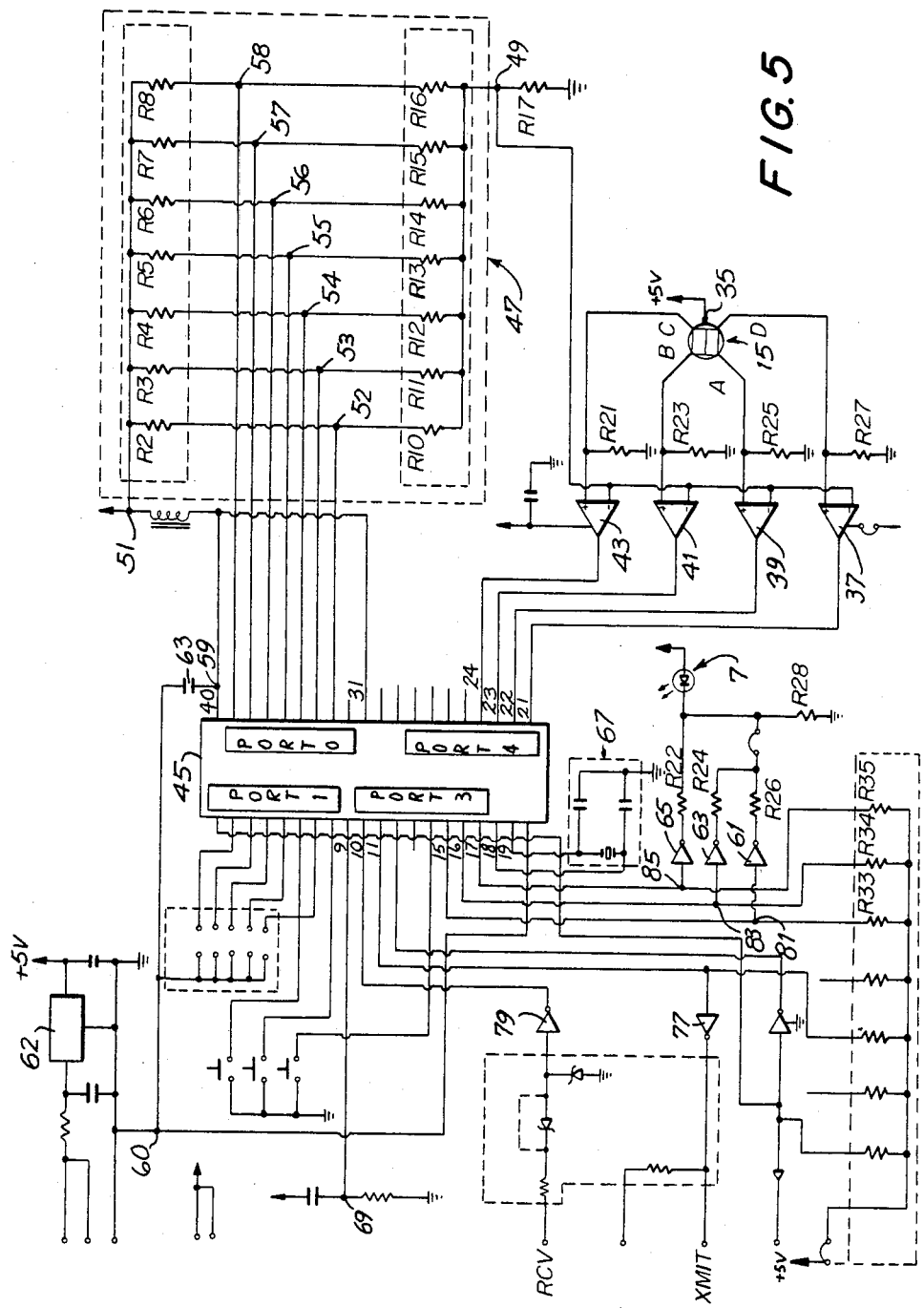
FIG. 5 is a diagram of the circuitry used in the mouse calibration system of the present invention.

Before describing the calibration method in accordance with the invention, the circuitry of the preferred embodiment as shown in FIG. 5 will be described in detail.

The common cathode 35 of photodetector array 15 is connected to a +5-volt power supply (not shown). The anodes of detectors A through D are respectively electrically connected to the positive input ports of the corresponding comparators 37, 39, 41 and 43. These comparators could each be of the LM339N type. Each comparator has two input ports and an output port. The output ports of these comparators are respectively connected to pins 21 through 24 of microprocessor 45. The microprocessor is preferably of the 8051/8751 type. Resistors R21, R23, R25 and R27 are respectively connected to junctions lying between the positive input ports of the comparators and the anodes of the photodetector. These resistors are connected to ground and each have a resistance of 1.0MΩ in the preferred embodiment. The negative input ports of comparators 37, 39, 41 and 43 are connected in common to the output of digital-to-analog converter 47.

The digital-to-analog converter comprises an array of resistors R2-R8 and R10-R16 connected across a pair of junctions 49 and 51. The array comprises pairs of resistors connected in series (R2/R10, . . . R8/R16), with the seven pairs of resistors in turn being connected in parallel across the junctions 49, 51. The junctions 52-58 respectively arranged between the pairs of series-connected resistors are in turn respectively electrically connected to pins 33-39 of microprocessor 45. Junction 49 is connected to ground by way of resistor R17 (39 kΩ) as well as to the negative input ports of comparators 37, 39, 41 and 43, and junction 51 is connected to a +5-volt power supply. Pin 31 of the microprocessor is connected to junction 51 by way of ferrite bead L1, as is pin 40.

The microprocessor 45 is electrically connected to light source 7 by way of inverters 61, 63 and 65 and respective resistors R26, R24 and R22. The input ports of inverters 61, 63 and 65 are respectively connected to pins 15, 16 and 17 of the microprocessor. The light source 7 is preferably an infrared light-emitting diode (type DSl). Light source 7 and resistor R28 (150Ω) are series-connected across a +5-volt power supply. Inverters 61, 63 and 65 are respectively biased by resistors R33, R34, and R35.

Light source 7 is controlled by microprocessor 45 through inverters 61, 63 and 65. The light-emitting diode 7 can emit any one of eight possible light intensities depending on the three-bit command output by microprocessor 45 at ports 15-17.

The clock 67 is connected to pins 18 and 19 of microprocessor 45. The voltage regulator 62 is electrically connected to junction 60, which is in turn connected to pin 20 (GND) of microprocessor 45 and to junction 59 by way of capacitor C3. Junction 59 is electrically connected to pin 40 (VCC).

The receive (RCV) and transmit (XMIT) terminals, which are connected to the host, are operatively coupled to pins 10 and 11 respectively of microprocessor 45 by way of inverters 79 and 77 respectively.

The reset terminal (i.e. pin 9) of microprocessor 45 is connected to junction 69. A capacitor C4 and resistor R9 are series-connected across a +5-volt source, with junction 69 situated between the capacitor and resistor.

During operation, housing 5 is gripped by the operator's hand and moved in any direction by sliding over the surface 3. Source 7 is positioned so that the emitted light impinges on surface 3. The light is then reflected if it impinges on reflective areas 33 or is absorbed if it impinges on non-reflective line segments 31. Detecting means 9 is positioned so that light emitted by source 7 and reflected by areas 33 is then detected by photodetector array 15.

Each detector of array 15 detects light independently, outputting a voltage signal proportional to the amount of light impinging on its surface. Detector A outputs a signal to comparator 37, detector B to comparator 39, detector C to comparator 41, and detector D to comparator 43. Each comparator switches when the output voltage of the corresponding photodetector crosses the respective threshold voltage being input from the digital-to-analog converter 47. The output ports of the comparators 37, 39, 41, 43 are connected to the microprocessor 45, which reads the output pattern at a regular rate. Each comparator output will either be a voltage signal representing that the respective detector output voltage is greater than or equal to the threshold voltage or a voltage signal representing that the respective detector output voltage is less than the threshold voltage. Thus, the output signal from each comparator has one of two voltage levels, which voltage levels the microprocessor treats as binary signals, e.g. "1" or "0". These binary signals are processed to obtain information regarding the movement of the mouse relative to the grid pattern as reflected in the varying outputs of the detector quadrants. For each sampling cycle, the microprocessor receives two bits from each comparator, thereby forming the eight-bit intensity code. The details of the thresholding procedure will be discussed further below.

FIGS. 6b–6d, 6f–6h and 6j–6l depict the so-called "movement legal" positions of the optical mouse relative to the grid pattern. There are a total of nine possible "movement legal" positions for each indicium. FIGS. 6b, 6c and 6d show movement of the mouse from left to right. The movement o the mouse from the position in FIG. 6b to the position in FIG. 6c constitutes a boundary crossing, i e. detector A crosses the boundary between a first non-reflective line segment 31' and a first reflective surface area 33'. The movement of the mouse from the position in FIG. 6c to the position in FIG. 6d constitutes another boundary crossing, i.e. detector D crosses the boundary between the first reflective surface area and a second non-reflective line segment. The movement of the mouse from the position in FIG. 6d to the position in FIG. 6b also constitutes a boundary crossing, i.e. detectors A and D both cross boundaries—detector A crossing from the first reflective surface area to the second non-reflective line segment and detector D crossing from the second non-reflective line segment to a second reflective surface area. Similarly, the movement of the mouse from the position in FIG. 6b to the position in FIG. 6f constitutes a boundary crossing, and so forth for each of the rows and columns depicted in FIGS. 6b-6d, 6f-6h and 6j-6l.

The movement between "movement legal" positions, i.e. the boundary crossings, are indicated by changes in the photodetector output voltages. These output voltages are processed by the circuitry of FIG. 5 to determine the direction of each boundary crossing and then count up or down by unity for each boundary crossing. The running count represents the absolute position of the mouse relative to a starting position.

Each of the positions depicted in FIGS. 6 is assigned a corresponding two-bit X code and a corresponding two-bit Y code. The X codes differ by only one bit for horizontally adjacent positions in FIGS. 6, while the Y codes differ by only one bit for vertically adjacent positions. FIGS. 6a, 6e, 6i and 6m show the sequence of positions during travel of the photodetector "view" along a vertical line. FIGS. 6m-6q shown the sequence of positions during travel along a horizontal line. Hereinafter, this travel of the photodetector "view", whereby at least two adjacent quadrants overlie a line during travel, will hereinafter be referred to as "riding". The condition wherein the "view" of a quadrant overlies a boundary will hereinafter be referred to as "straddling."

One problem which the above-described mouse overcomes is that the photodetector output volt ages are ambiguous when the photodetector is sensing the square areas indicated by A-D in FIGS. 6e and 6p. The output voltages are ambiguous in the sense that they are identical for the two straddle positions respectively shown in FIGS. 6e and 6p. Therefore, it is not possible to determine which of the two positions is being occupied by the mouse without further processing of the photodetector output volt ages. Based on the photodetector output voltages alone, the microprocessor 45 can only determine that the mouse is in one of the two positions. Hence the photodetector output voltages are ambiguous.

This problem is overcome by using a look-ahead technique whereby the current position is determined by comparing the future, i.e. new or next, position of the mouse with the past, i.e. old or previous, position. This look-ahead technique is described in detail in co-pending U.S. patent application Ser. No. 860,231, which is assigned to the assignee of the present application.

Figure 4:
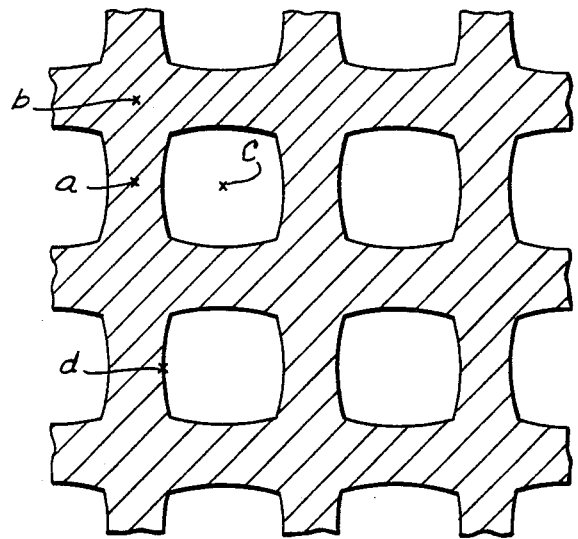
FIG. 4 is a view of the grid pattern of FIG. 3a as seen by the photodetectors of the optical mouse when degraded optical components are used.

Another problem which the above-described optical mouse has been designed to overcome is that the photodetector output voltages produced using the grid pattern of FIGS. 3a and 3b do not conform identically to the geometric grid pattern as seen by the human eye. As mentioned previously, the use of non-ideal optical components in the mouse distorts the geometric pattern as viewed by the mouse. The geometric pattern when "seen" by the photodetector appears as shown in FIG. 4. This problem is solved by increasing the resolution of the mouse using a non-linear thresholding technique.

Figure 7:
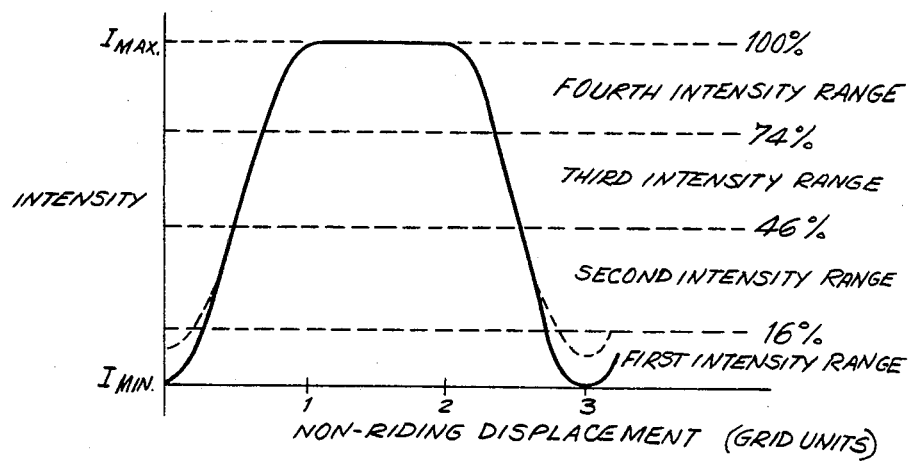
FIG. 7 is a graphical representation of the intensity values of a single quadrant of the four-quad photodetector during "non-riding" unidirectional movement.

Referring to FIG. 7, the thresholding technique used by the optical mouse will be described. The mouse achieves a four-level resolution by utilizing a thresholding technique whereby the threshold voltage supplied to comparators 37, 39, 41 and 43 can take on three possible values for each quadrant. These values are unique for each quadrant and are determined in accordance with the calibration procedure described hereinafter. The variations in the exact threshold levels for respective quadrants reflect the fact that differences arise in the characteristics of each quadrant during the manufacturing process. In other words, no two quadrants are identical. Since each of the four quadrants will have three threshold levels associated therewith, there will be a total of 12 threshold levels stored in the internal random access memory of the microprocessor. These threshold levels are obtained as the result of t he calibration. However, in order to determine in which of the four intensity ranges a quadrant voltage output lies, it is only necessary to sample the comparator outputs for two of the three threshold levels for that quadrant. Thus, the threshold voltages for each quadrant are output to the comparators in accordance with the following pattern: (a) the microprocessor 45 outputs the digital value corresponding to the intermediate threshold level to the D/A converter 47; (b) if the corresponding comparator output indicates that the quadrant output voltage is less than the intermediate threshold voltage, then the microprocessor next outputs the digital value corresponding to the lowest threshold level; (c) if the corresponding comparator output indicates that the quadrant output voltage is equal to or greater than the intermediate threshold voltage, then the microprocessor next outputs the digital value corresponding to the highest threshold level Thus, the intensity range of the quadrant output can be determined by a two-stage three-level thresholding technique, wherein the threshold voltage which is applied during the second thresholding step for each quadrant will depend on the results of the first thresholding step.

The threshold voltages output by digital-to-analog converter 47 correspond to the threshold intensity levels shown in the graph of FIG. 7. As previously described, each quadrant of the photodetector outputs a voltage substantially proportional to the amount, i.e. intensity, of reflected light impinging on the quadrant. The graph in FIG. 7 shows the magnitude of the impinging light intensity for a single quadrant of the photodetector as the mouse translates (without "riding" a line) across three consecutive grid units in either the X or Y direction (recall that a grid unit equals the width of a line segment 31). The solid curve represents the theoretical intensity under ideal conditions, whereas the dashed portions represent the actual intensity, which diverges from the theoretical. The intensity of impinging light is given as a percentage of an intensity $I_{cal}$, which is the range of intensity measured during the calibration procedure. The quantity $I_{cal}$ represents the difference between the maximum and minimum intensities detected during sampling in accordance with the calibration routine, i.e. $I_{cal}=I_{max}-I_{min}$. The minimum intensity $I_{min}$ is due to leakage light impinging on the photodetector quadrant and a voltage produced by the hardware itself as the result of bias current in the photodetector.

As can be seen from FIG. 7, the light intensity detected by a photodetector quadrant theoretically varies from a value substantially equal to zero when the view of the quadrant entirely overlies a non-reflective line segment to a peak value when the view of the same quadrant entirely overlies a reflective surface area. As a practical matter, however, the light intensity when a single quadrant totally overlies a line (not a line intersection) will be about $I_{min}+0.10I_{cal}$ due to the aforementioned leakage light and bias current ($I_{min}$) and optical phenomena such as diffraction ($0.10I_{cal}$). (Point a in FIG. 4 indicates the position of the center of the quadrant "view" at which the intensity of impinging light is $I_{min}$ plus 10% of $I_{cal}$, point b indicates the position at which the intensity is substantially equal to $I_{min}$, point c indicates the position at which the intensity is substantially equal to $I_{min}+I_{cal}$, and point d indicates the position at which the intensity is $I_{min}$ plus 50% of $I_{cal}$.) After attaining the peak value, the intensity decreases until it again reaches a value substantially equal to $I_{min}+0.10I_{cal}$ corresponding to the position where the view of the same detector overlies the next non-reflective line segment. By varying the threshold voltage input to the comparator, the mouse of the invention is able to detect within which of four intensity ranges the quadrant voltage output, proportional to light intensity, lies. In the preferred embodiment the respective threshold levels are as follows: $I_{ref1}=I_{min}+0.16I_{cal}$, $I_{ref2}=I_{min}+0.46I_{cal}$, and $I_{ref3}=I_{min}+0.74I_{cal}$. Recalling that $I_{cal}=I_{max}-I_{min}$, the result of this thresholding scheme is that the mouse is able to detect whether the intensity of the light impinging on a quadrant of the photodetector is $\geq I_{min}$ and $<I_{min}+0.16(I_{max}-I_{min})$, $\geq I_{min}+0.16(I_{max}-I_{min})$ and $<I_{min}+0.46(I_{max}-I_{min})$, $\geq I_{min}+0.46(I_{max}-I_{min})$ and $<I_{min}+0.74(I_{max}-I_{min})$, or $\geq I_{min}+0.74(I_{max}-I_{min})$, where $I_{max}$ and $I_{min}$ are respectively the maximum and minimum intensities detected during calibration.

The microprocessor performs the calibration procedure as part of an initialization routine. First, the microprocessor takes a predetermined number of samples for each channel (i.e for each quadrant and corresponding comparator) while the mouse is moved randomly over the grid surface. The sample photodetector outputs are processed by the microprocessor to obtain $I_{min}$ and $I_{max}$ for each channel. Then the microprocessor calculates the threshold values $I_{min}+0.16(I_{max}-I_{min})$, $I_{min}+0.46(I_{max}-I_{min})$ and $I_{min}+0.74(I_{max}-I_{min})$ for each channel. Each of these threshold values is stored as a seven-bit code in the internal random access memory of the microprocessor.

When the initialization routine has been completed, the digitization routine is begun. In accordance with the digitization routine, the photodetector outputs are sampled to form an eight-bit intensity code representing the intensity values of the light being detected by the four quadrants of the detector at a particular position. It will be apparent that an eight-bit intensity code could correspond to one of 256 possible values. The microprocessor forms this eight-bit intensity code by processing the eight bits of information received from the comparators during one thresholding cycle. The eight bits correspond to the two separate outputs obtained from each of the four comparators when the respective intermediate and either highest or lowest threshold voltages are successively output by the digital-to-analog converter. These analog threshold voltages are output in response to the output of the respective digital threshold values by the microprocessor. The resulting eight-bit intensity code comprises four two-bit codes, each two-bit code (hereinafter referred to as "quadrant intensity code") representing the intensity range in which the light impinging on the corresponding photodetector quadrant falls. For example, if the intensity of light impinging on a quadrant lies in the first intensity range (see FIG. 7), then the corresponding comparator output will be low for both samples and the microprocessor will store the two-bit binary code 00 at the appropriate address in internal RAM. If the intensity is in the second intensity range, then the binary code 01 is stored. If the intensity is in the third intensity range, then the binary code 10 is stored. And lastly, if the intensity is in the fourth intensity range, then the binary code 11 is stored. In this manner, a two-bit intensity code is stored for each quadrant of the photodetector, thereby forming an eight-bit word (i.e. intensity code) representing the amounts of light impinging on the respective photodetector quadrants. This eight-bit intensity code then undergoes further processing by the microprocessor to determine the direction of incremental (i.e. one grid unit) movements of the mouse along the X and Y axes, as described in detail in the aforementioned co-pending U.S. patent application Ser. No. 860,231.

The calibration method in accordance with the invention will now be described in detail with reference to FIGS. 8 and 9.

Figure 8:
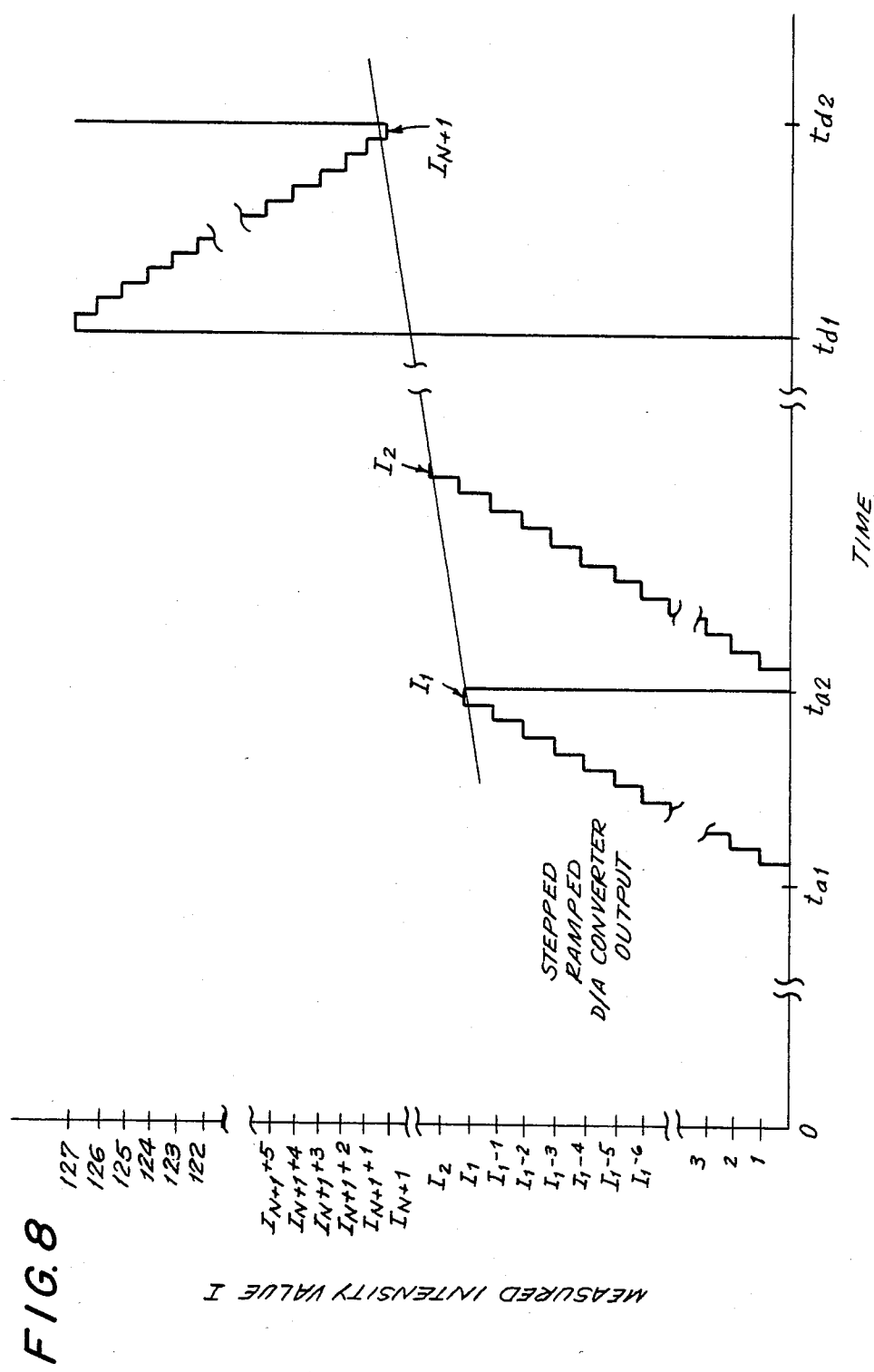
FIG. 8 is a diagram showing the measured intensity levels of light impinging on a quadrant during calibration in accordance with the invention in relation to the ascending and descending stepped ramps respectively.

FIG. 8 generally illustrates a small portion of a sampling cycle. During a sampling cycle the microprocessor 45 repeatedly outputs ramped digital signals to the digital-to-analog converter (DAC) 47. The ramps of digital signals take two forms: ascending ramps and descending ramps.

For the ascending ramps, the microprocessor begins by outputting a digital value of zero and then successively incrementing the output digital value by unity until the comparator being sampled switches to output a "0", indicating that the corresponding quadrant output voltage has become less than the DAC output voltage in response to the most recent increment by unity. The digital values are successively stored in an internal register and output therefrom by the microprocessor to the digital-to-analog converter. The ramped values are generated by sending signals to the register which increment the count in the register by unity at a predetermined clocking rate. A typical stepped ascending ramped DAC output voltage is shown in FIG. 8, beginning at time $t_{a1}$ and ending at time $t_{a2}$. At time $t_{a2}$ the microprocessor stores the intensity value $I_1$ in response to the voltage ramp crossing the curve representing the quadrant output voltage, as described in detail below. The microprocessor then repeats this ramping operation to obtain $I_2$ by again outputting a digital value of zero at time $t_{a2}$ and thereafter successively incrementing the output digital value by unity until the comparator being sampled again switches to output a "0". This ascending ramping operation is repeated N times for each channel to obtain a block of measured intensity values $I_1$ to $I_N$. The ramps are supplied at a frequency such that the mouse can be moved only incrementally in the time interval between successive ramps.

For the descending ramp, the microprocessor begins by outputting a digital value 127 from an internal register and then successively decrementing the digital value stored in the register by unity until the comparator being sampled switches to output a "1" when the register contents are output, indicating that the corresponding quadrant output voltage has become greater than the DAC output voltage in response to the most recent decrement by unity. A typical stepped descending ramped DAC output voltage is shown in FIG. 8, beginning at time $t_{d1}$ and ending at time $t_{d2}$. As for the ascending ramps, the descending ramping operation is repeated N times for each channel to obtain a series of measured intensity values $I_{N+1}$ to $I_{2N}$.

An exemplary ramping pattern entails sampling channel A (i.e. quadrant A/comparator 39) using N ascending ramps followed by N descending ramps. Then channel B (i.e. quadrant B/comparator 41) is sampled using N ascending ramps followed by N descending ramps. Next, channel C (i.e. quadrant C/comparator 43) is sampled using N ascending ramps followed by N descending ramps. Finally, channel D (i.e. quadrant D/comparator 37) is sampled using N ascending ramps followed by N descending ramps. This sampling cycle is repeated three times. In the preferred embodiment, N=200 although it would be obvious to a practitioner of ordinary skill in the art that N could take on other values.

For each channel, the microprocessor determines the values $I_{max}$ and $I_{min}$, as previously described. This is accomplished by storing the measured intensity value $I_1$ (see FIG. 8) in a register IMAX and in a register IMIN after the first ascending ramp and then comparing the measured intensity value $I_2$ with the stored value $I_1$ after the second ascending ramp. If $I_2 > I_1$, then $I_2$ is stored in register IMAX in place of $I_1$ and the value stored in register IMIN remains unchanged. If $I_2 < I_1$, then $I_2$ is stored in register IMIN in place of $I_1$ and the value stored in register IMAX remains unchanged. Next the measured intensity value $I_3$ is compared with the values stored in the IMAX and IMIN registers after the third ascending ramp has been halted. If $I_3$ is greater than the value stored in register IMAX, then $I_3$ is stored therein. Otherwise the value stored in register IMAX remains unchanged. If $I_3$ is less than the value stored in register IMIN, then $I_3$ is stored therein. Otherwise the value stored in register IMIN remains unchanged. This process is repeated for each of the 3N ascending ramps and each of the 3N descending ramps applied to a channel to obtain $I_{max}^x$ and $I_{min}^x$ for that channel, where X=A, B, C or D. $I_{max}^x$ and $I_{min}^x$ will respectively be the maximum and minimum values taken from the measured intensity values $I_1$ to $I_{3N}$ for channel X.

After each block of N samples, the values stored in registers IMAX and IMIN are respectively compared with the values of $I_{max.lim}$ and $I_{min.lim}$, which in the preferred embodiment are respectively equal to intensity values of 121 and 12 on a scale from 0 to 127. If $I_{max} > I_{max.lim}$, then the LED intensity level is adjusted to the next lower level and the sampling cycle is begun anew. If $I_{min} < I_{min.lim}$, then the LED intensity level is adjusted to the next higher level and the sampling cycle is begun anew. If $I_{max} \leq I_{max.lim}$ and $I_{min} \geq I_{min.lim}$, then no adjustment of the LED intensity level is necessary.

Figure 9:
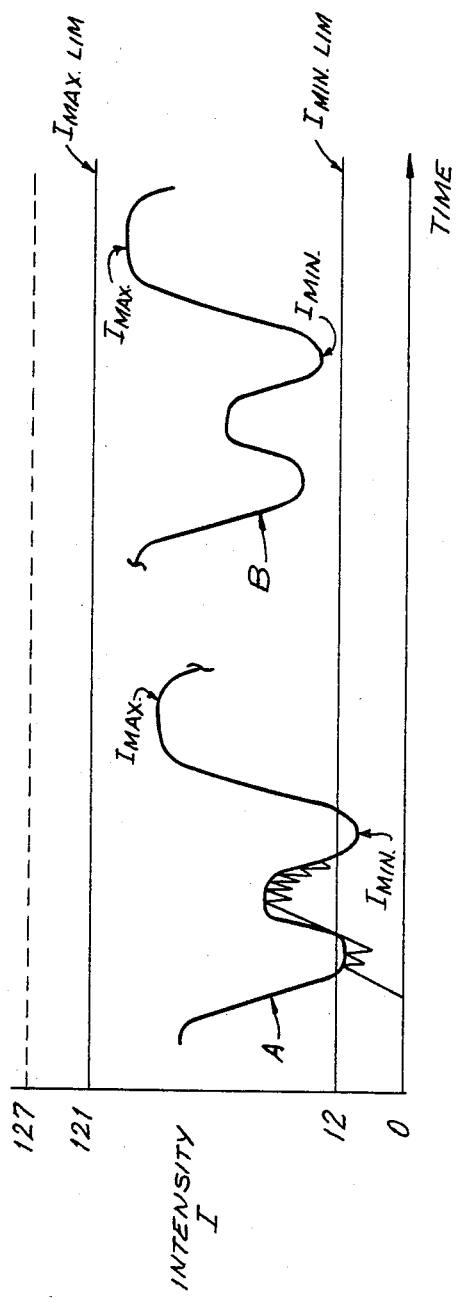
FIG. 9 is a diagram showing hypothetical measured intensity levels detected by a quadrant when the initial intensity level of the light-emitting means is too low.

This aspect of the invention is illustrated in FIG. 9. Sample waveform A for one of the channels is shown as falling below $I_{min.lim}$. After a block of N samples have been obtained for the channel being sampled, the microprocessor 45 compares $I_{min}$ with $I_{min.lim}$ and $I_{max}$ with $I_{max.lim}$. Because $I_{min}$ is less than $I_{min.lim}$ (i.e. 12). The intensity level of the LED 7 is adjusted to the next higher level, following which another block of N samples are acquired for the same channel. This adjustment of the LED intensity level is reflected in a shifting of the waveform upward. If the waveform is shifted upward into the acceptable range, i.e. between $I_{min.lim}$ and $I_{max.lim}$ (see waveform B in FIG. 9, which is shifted upward with respect to waveform A), then no further adjustment of the LED intensity is necessary.

Figure 11:
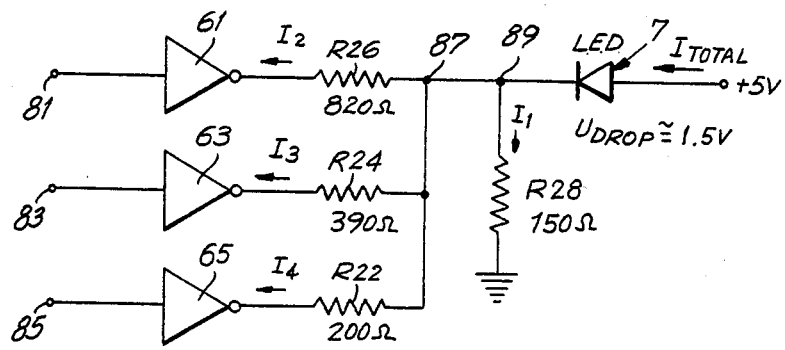
FIG. 11 is a diagram of light-emitting circuitry similar to that depicted in FIG. 5.

The adjustment of the LED intensity will now be described in detail with reference to FIG. 11. The intensity of LED 7 is dependent on the current $I_{total}$ which flows therethrough. The current $I_{total}$ in turn depends on whether currents are flowing through the inverters 61, 63 and 65 which are arranged in parallel between junction 87 and the microprocessor 45. Junction 87 is connected to the negative terminal of LED 7 by way of junction 89, which is connected to ground by way of resistor R28 (150Ω). A current $I_1$ flows through resistor R28. The inverters 61, 63 and 65 are respectively connected to junction 87 by way of resistors R26 (820Ω), R24 (390Ω), and R22 (200Ω), and are respectively connected to pins 15, 16 and 17 of microprocessor by way of junctions 81, 83 and 85. Junctions 81, 83 and 85 are in turn connected to a +5 voltage source by way of resistors R33, R34 and R35 of resistor array 91.

The amount of current $I_{total}$ is determined by a three-bit code output from pins 15-17 of microprocessor 45. Each bit of this three-bit code switches on the corresponding inverter. For example, if the microprocessor outputs a "1" at pin 15, the microprocessor acts as a source of bias current for switching on the transistor inside inverter 61. However, because the current supplied by the microprocessor is barely sufficient to bias the transistor, an additional current is provided to inverter 61 from resistor R33. In response to sufficient bias current, inverter 61 acts as a current sink, resulting in a flow of current $I_2$ through resistor R26 and toward inverter 61. When the microprocessor outputs a "0" at pin 15, the microprocessor acts as a current sink. Therefore, all of the current from resistor R33 flows toward the microprocessor and accordingly inverter 61 is not biased, i.e. receives no bias current.

Similarly, a "1" output at pin 16 of microprocessor 45 produces a current $I_3$ flowing through resistor R24 and toward inverter 63 and a "1" output at pin 17 produces a current $I_4$ flowing through resistor R22 and toward inverter 65.

Thus, the microprocessor can control the amount of current $I_{total}$ flowing through LED 7 by switching on one or more of the inverters. If all of the invertors 61, 63 and 65 are switched off, then $I_{total}=I_1$. If invertor 61 is switched on, current $I_2$ is added to $I_1$ so that $I_{total}=I_1+I_2$. If invertor 63 is switched on, current $I_3$ is added to $I_1$ so that $I_{total}=I_1+I_3$. If invertor 65 is switched on, current $I_4$ is added to $I_1$ so that $I_{total}=I_1+I_4$. The following table shows the dependence of $I_{total}$ on the three-bit code output by microprocessor 45 via pins 15, 16 and 17.

| 15 | 16 | 17 | $I_{total}$ |
|---|---|---|---|
| 0 | 0 | 0 | $I_1$ |
| 1 | 0 | 0 | $I_1 + I_2$ |
| 0 | 1 | 0 | $I_1 + I_3$ |
| 1 | 1 | 0 | $I_1 + I_2 + I_3$ |
| 0 | 0 | 1 | $I_1 + I_4$ |
| 1 | 0 | 1 | $I_1 + I_2 + I_4$ |
| 0 | 1 | 1 | $I_1 + I_3 + I_4$ |
| 1 | 1 | 1 | $I_1 + I_2 + I_3 + I_4$ |

For the preferred embodiment, $I_1=23.3$ mA, $I_2=4.27$ mA, $I_3=8.97$ mA, and $I_4=17.5$ mA, which gives:

| 15 | 16 | 17 | $I_{total}$ (mA) |
|---|---|---|---|
| 0 | 0 | 0 | 23.3 |
| 1 | 0 | 0 | 27.57 |
| 0 | 1 | 0 | 32.27 |
| 1 | 1 | 0 | 36.54 |
| 0 | 0 | 1 | 40.8 |
| 1 | 0 | 1 | 45.07 |

-continued

| 15 | 16 | 17 | $I_{total}$ (mA) |
|---|---|---|---|
| 0 | 1 | 1 | 49.77 |
| 1 | 1 | 1 | 54.04 |

The object of adjusting the LED intensity in the foregoing manner is to obtain $I_{max}$ and $I_{min}$ values for each of the channels A-D which fall within the acceptable range, i.e. between $I_{max.lim}$ and $I_{min.lim}$. In the preferred embodiment, as previously noted, $I_{max.lim} = 121$ and $I_{min.lim} = 12$. These $I_{max}$ and $I_{min}$ values are then used to calculate the threshold levels $I_{ref1} = I_{min} + 0.16I_{cal}$, $I_{ref2} = I_{min} + 0.46I_{cal}$, and $I_{ref3} = I_{min} + 0.74I_{cal}$, where $I_{cal} = I_{max} - I_{min}$. Fractional values resulting from the calibration will be truncated. The values $I_{ref1}$, $I_{ref2}$, and $I_{ref3}$ are stored in internal random access memory for retrieval during position coordinate determination.

The foregoing calibration sub-routine is carried out as part of the mouse initialization routine. Depending on the calibration results, the LED intensity can be adjusted as necessary to compensate for any change in the LED performance due to aging. In the event that the LED intensity cannot be adjusted to a level such that the readings on all four channels A-D lie within the acceptable range $I_{max.lim}$ to $I_{min.lim}$, the microprocessor will output a signal for activating a warning light (not shown) to indicate a failure condition.

Figure 10:
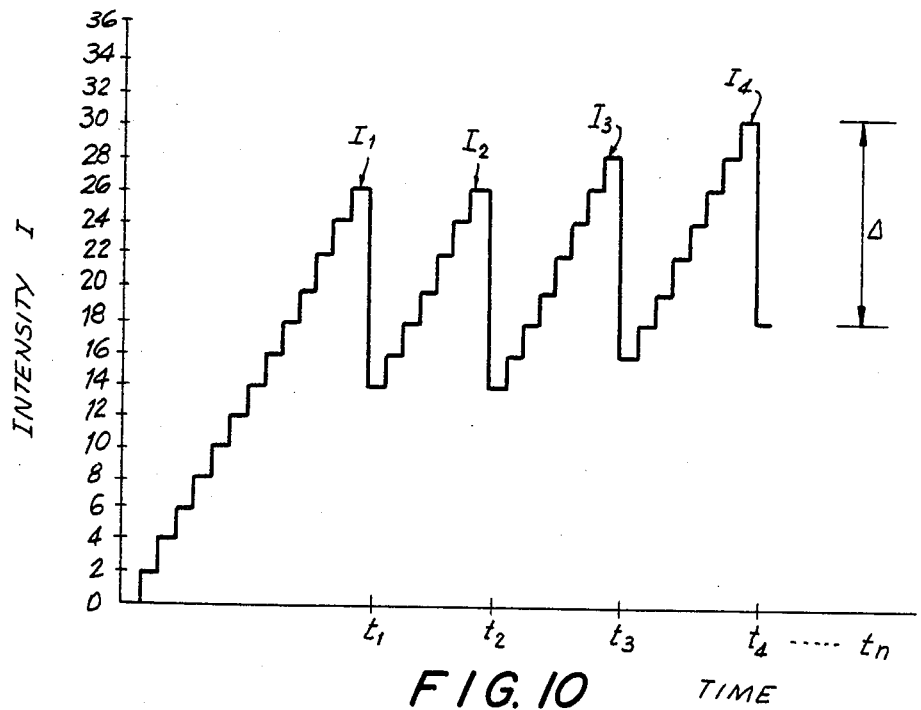
FIG. 10 is a diagram showing the measured intensity levels of light imaging on a quadrant during calibration in accordance with another embodiment of the invention in relation to the ascending stepped ramps.

A second preferred embodiment of the method in accordance with the invention is partially depicted in FIG. 10. In order to speed up the calibration procedure, the ramping can be modified such that the microprocessor 45 outputs successive digital values to digital-to-analog convertor 47 which are incremented by a value of two each step. Naturally, this results in greater error in the values of $I_{max}$ and $I_{min}$. For example, if $I_{max}$ is actually 113 at a given sampled instant, and if the ascending ramps comprise even digital values (i.e. 0, 2, 4, 6...), then at the instant when $I_{max}$ is being sampled the corresponding comparator will be triggered only after the output of the microprocessor has gone from 112 to 114. The microprocessor will store a value of 114 when in actuality the intensity level was 113. To compensate for this error, the descending ramps comprise only odd digital values (i.e., 127, 125, 123, 121...). Therefore, although the microprocessor has stored a value of $I_{max}$ equal to 114 as a result of the block of ascending ramp samples, the descending ramps will trigger the comparator at a value of 113 when the $I_{max}$ value is being sampled. Thus, the error inherent in ramping in steps of two is eliminated by using ascending ramps with even digital values and descending ramps with odd digital values. Alternatively, one could use ascending ramps with odd digital values and descending ramps with even digital values.

In order to increment the digital output of microprocessor 45 by 2, the current ramp value stored in a register in internal memory must be transferred to the arithmetic unit inside the microprocessor. The arithmetic unit adds 2 to the digital ramp value received and then transfers the incremented value back to the same register, from where it is output to the DAC 47. By performing this operation repeatedly, an ascending ramp can be output having step values of 2. In order to obtain a descending ramp having step values of 2, the arithmetic unit must subtract 2 from the register contents.

The ramping operation can be speeded up even further by increasing the stepping value to 3 or more, at the cost of decreased accuracy however.

In accordance with a further refinement depicted in FIG. 10, the ramping operation can be speeded up further by starting the first ascending ramp of each block at 2 and starting subsequent ascending ramps at values which are less than the measured intensity values by a predetermined amount $\Delta$. Thus, the subsequent ascending ramps begin at $I_n - \Delta$, where $n = 2, 3, \ldots, N$. The subsequent ascending ramps require less time to trigger the comparator whose output is being sampled since the steps from 0 to $I_n - \Delta$ are eliminated, with corresponding time savings. In the preferred embodiment, $\Delta = 12$. However, it is apparent to those of ordinary skill in the art that other values of $\Delta$ would be suitable as long as $\Delta \leq 12$. Similarly, the first descending ramp in a block is started at 125 in the preferred embodiment, but subsequent descending ramps are started at values which are greater than the measured intensity values by the predetermined amount, i.e. $I_n + \Delta$, where $n = N+2, N+3, \ldots, 2N$.

As previously discussed, the microprocessor tests the acquired $I_{max}$ and $I_{min}$ values for each channel to determine whether $I_{max} > I_{max.lim}$ (i.e. 121) and whether $I_{min} < I_{min.lim}$ (i.e. 12). In addition, the microprocessor also calculates and tests the value $I_{max} - I_{min}$ in accordance with stored program instructions. It should be pointed out that the range $I_{max} - I_{min}$ increases as $I_{min}$ increases. The microprocessor is programmed to maintain $I_{max} - I_{min}$ within a predetermined range. On the one hand, if $I_{max} - I_{min} > 105$, then the LED intensity will be automatically adjusted to the next lower level. On the other hand, if $I_{max} - I_{min} < 35$, the LED intensity will be adjusted to the next higher level. These checks ensure a signal that can be processed with acceptable margins of error.

The routines for performing the above-described calibration are disclosed in the Appendix attached hereto.

The foregoing description of the preferred embodiments is presented for illustrative purposes only and is not intended to limit the scope of the invention as defined in the appended claims. Modifications may be readily effected by one having ordinary skill in the art without departing from the spirit and scope of the inventive concept herein disclosed.

APPENDIX

```
MCS-51 MACRO ASSEMBLER      SUMMA GRID MOUSE PROGRAM V14.0            07-24-86

LOC   OBJ              LINE      SOURCE

373       ;*******************************************
                       374       ;
01B4  753B00           375       CALBRB:  MOV      OLDVLT,#0         ;
01B7  753CC8           376                MOV      LOOP,#200         ;
                       377       ;
```

```
01BA E580       378        CYCLE:  MOV    A,P0           ;LOAD LAST VOLTAGE
01BC 2524       379                ADD    A,ALOW         ;MODIFY VOLTAGE
01BE 30E710     380                JNB    ACC.7,SYCEL    ;JUMP IF < 128
01C1 202705     381                JB     ALOW.7,SF2     ;JUMP IF OFFSET IS NEG
01C4 75807F     382                MOV    P0,#127        ;MAXIMUM VALUE
01C7 8003       383                SJMP   SF1            ;
01C9 758000     384        SF2:    MOV    P0,#0          ;MINIMUM VALUE
01CC D53C04     385        SF1:    DJNZ   LOOP,SYCLE     ;
01CF 8048       386                SJMP   GVOLT          ;EXIT
01D1 F580       387        SYCEL:  MOV    P0,A           ;
01D3 E580       388        SYCLE:  MOV    A,P0           ;A = CURRENT VOLTAGE
01D5 2537       389                ADD    A,CHANGE       ;CHANGE VOLTAGE
01D7 30E705     390                JNB    ACC.7,ALRITE   ;JUMP IF < 128
01DA D53CDD     391                DJNZ   LOOP,CYCLE     ;
01DD 803A       392                SJMP   GVOLT          ;EXIT
01DF F580       393        ALRITE: MOV    P0,A           ;SET NEW VOLTAGE
01E1 E538       394                MOV    A,TSTBIT       ;REFERENCE PATTERN
01E3 B5A0ED     395                CJNE   A,P2,SYCLE     ;JUMP IF NO TRANSITION
                396        ;
01E6 309803     397                JNB    RI,RMP1        ;JUMP IF NO RCV WORD
01E9 120870     398                LCALL  SERVCE         ;
01EC E53B       399        RMP1:   MOV    A,OLDVLT       ;A=OLD VOLTAGE
01EE C3         400                CLR    C              ;
01EF 9580       401                SUBB   A,P0           ;DIFF=OLD-NEW
01F1 30E702     402                JNB    ACC.7,ABSV     ;JUMP IF DIFF IS POS
01F4 F4         403                CPL    A              ;
01F5 04         404                INC    A              ;CONVERT TO POSITIVE
01F6 24FC       405        ABSV:   ADD    A,#-4          ;IS DIFF > 3 ?
01F8 20E7BF     406                JB     ACC.7,CYCLE    ;JUMP IF NO
01FB 85803B     407                MOV    OLDVLT,P0      ;OLD VOLT = NEW VOLT
                408        ;
01FE E53B       409                MOV    A,OLDVLT       ;A = NEW VOLT
0200 C3         410                CLR    C              ;
0201 953A       411                SUBB   A,MINVLT       ;IS NEW VOLT < MIN VOLT?
0203 30E705     412                JNB    ACC.7,CHKMX    ;JUMP IF NO
0206 853B3A     413                MOV    MINVLT,OLDVLT  ;MINVOLT=NEW VOLT
0209 B00B       414                SJMP   LOUPE          ;
020B E53B       415        CHKMX:  MOV    A,OLDVLT       ;A=NEW VOLTAGE
020D C3         416                CLR    C              ;
020E 9539       417                SUBB   A,MAXVLT       ;IS NEW >MAX VOLT?
0210 20E703     418                JB     ACC.7,LOUPE    ;JUMP IF NO
0213 853B39     419                MOV    MAXVLT,OLDVLT  ;MAX VOLT = NEW VOLT
0216 D53CA1     420        LOUPE:  DJNZ   LOOP,CYCLE     ;
                421        ;
0219 B80024     422        GVOLT:  CJNE   R0,#0,CCDD     ;BYPASS IF IN TEST
021C E539       423                MOV    A,MAXVLT       ;
021E 2487       424                ADD    A,#-121        ;IS MAX > 120 ?
0220 30E71E     425                JNB    ACC.7,LESPWR   ;JUMP IF YES
0223 E53A       426                MOV    A,MINVLT       ;
0225 24F3       427                ADD    A,#-13         ;IS MIN > 12 ?
0227 20E723     428                JB     ACC.7,MORPWR   ;JUMP IF NO
022A E539       429                MOV    A,MAXVLT       ;
022C C3         430                CLR    C              ;
022D 953A       431                SUBB   A,MINVLT       ;DIFF = MAX - MIN
022F 30E702     432                JNB    ACC.7,MCMC     ;JUMP IF DIFF < 127
0232 E57F       433                MOV    A,127          ;MAX DIFFERENCE
0234 FE         434        MCMC:   MOV    R6,A           ;SAVE DIFF
0235 2497       435                ADD    A,#-105        ;IS DIFF > 104?
0237 30E707     436                JNB    ACC.7,LESPWR   ;JUMP IF YES
023A EE         437                MOV    A,R6           ;
023B 240C       438                ADD    A,#-36         ;IS DIFF > 35?
023D 20E70D     439                JB     ACC.7,MORPWR   ;JUMP IF NO
0240 22         440        CCDD:   RET                   ;
                441        ;
0241 E5B0       442        LESPWR: MOV    A,P3           ;READ CURRENT LEVEL
0243 54E4       443                ANL    A,#0E4H        ;
0245 24E0       444                ADD    A,#-32         ;DECREASE POWER
0247 4413       445                ORL    A,#13H         ;
0249 F5B0       446                MOV    P3,A           ;
024B 800A       447                SJMP   TRYAGN         ;
024D E5B0       448        MORPWR: MOV    A,P3           ;READ CURRENT LEVEL
024F 54E4       449                ANL    A,#0E4H        ;
0251 2420       450                ADD    A,#32          ;INCREASE POWER
0253 4413       451                ORL    A,#13H         ;
0255 F5B0       452                MOV    P3,A           ;
0257 D53502     453        TRYAGN: DJNZ   TICKER,REECAL  ;
```

```
025A D264        454                SETB     STATUS.4       ;SET LED PROBLEM FLAG
025C 753903      455    REECAL:     MOV      MAXVLT,#3      ;
025F 753A78      456                MOV      MINVLT,#120    ;RESET
0262 E53D        457                MOV      A,CHANEL       ;
0264 425A        458                ORL      SWITCH,A       ;IDENTIFY ALTERED CHANEL
0266 21B4        459                AJMP     CALBR8         ;TRY AGAIN
                 460    ;
0268 758093      461    FINDVT:     MOV      P3,#93H        ;MEDIUM LED POWER
026B 7B00        462                MOV      R3,#0          ;
026D 7800        463    RECAL:      MOV      R0,#0          ;
026F 885A        464                MOV      SWITCH,R0      ;
0271 7403        465    VOLTGE:     MOV      A,#3           ;
0273 F535        466                MOV      TICKER,A       ;
0275 F530        467                MOV      BUFFER,A       ;
0277 F541        468                MOV      AMAX,A         ;------------------------
0279 F542        469                MOV      BMAX,A         ;
027B F543        470                MOV      CMAX,A         ;
027D F544        471                MOV      DMAX,A         ;
027F 747D        472                MOV      A,#125         ;     INITIALIZE
0281 F545        473                MOV      AMIN,A         ;
0283 F546        474                MOV      BMIN,A         ;
0285 F547        475                MOV      CMIN,A         ;
0287 F548        476                MOV      DMIN,A         ;------------------------
                 477    ;
0289 753D01      478    SCAN:       MOV      CHANEL,#1      ;CHANNEL A
028C 85453A      479                MOV      MINVLT,AMIN    ;
028F 854139      480                MOV      MAXVLT,AMAX    ;
0292 120A76      481                LCALL    MAX            ;MEASURE VOLTAGES
0295 853A45      482                MOV      AMIN,MINVLT    ;
0298 853941      483                MOV      AMAX,MAXVLT    ;
                 484    ;
029B 753D02      485                MOV      CHANEL,#2      ;CHANNEL B
029E 85463A      486                MOV      MINVLT,BMIN    ;
02A1 854239      487                MOV      MAXVLT,BMAX    ;
02A4 120A76      488                LCALL    MAX            ;MEASURE VOLTAGES
02A7 853A46      489                MOV      BMIN,MINVLT    ;
02AA 853942      490                MOV      BMAX,MAXVLT    ;
                 491    ;
02AD 753D04      492                MOV      CHANEL,#4      ;CHANNEL C
02B0 85473A      493                MOV      MINVLT,CMIN    ;
02B3 854339      494                MOV      MAXVLT,CMAX    ;
02B6 120A76      495                LCALL    MAX            ;MEASURE VOLTAGES
02B9 853A47      496                MOV      CMIN,MINVLT    ;
02BC 853943      497                MOV      CMAX,MAXVLT    ;
                 498    ;
02BF 753D08      499                MOV      CHANEL,#8      ;CHANNEL D
02C2 85483A      500                MOV      MINVLT,DMIN    ;
02C5 854439      501                MOV      MAXVLT,DMAX    ;
02C8 120A76      502                LCALL    MAX            ;MEASURE VOLTAGES
02CB 853A48      503                MOV      DMIN,MINVLT    ;
02CE 853944      504                MOV      DMAX,MAXVLT    ;
                 505    ;
02D1 D53085      506                DJNZ     BUFFER,SCAN    ;REPEAT
02D4 BB0A01      507                CJNE     R3,#10,THRESH  ;JUMP IF NOT TEST
02D7 22          508                RET                     ;RETURN IF IN TEST
                 509    ;
                 510    ;THE FOLLWING CODE COMPUTES THE ACTUAL THRESHOLDS
                 511    ;
02D8 E55A        512    THRESH:     MOV      A,SWITCH       ;
02DA 6003        513                JZ       GREAT          ;JUMP IF UNIFORM LED
02DC B4018E      514                CJNE     A,#1,RECAL     ;JUMP IF NOT UNIFORM
02DF 51E9        515    GREAT:      ACALL    AHOLD          ;
02E1 7107        516                ACALL    BHOLD          ;
02E3 7125        517                ACALL    CHOLD          ;
02E5 7143        518                ACALL    DHOLD          ;
02E7 6161        519                AJMP     STATIC         ;
                 520    ;
02E9 E541        521    AHOLD:      MOV      A,AMAX         ;
02EB C3          522                CLR      C              ;
02EC 9545        523                SUBB     A,AMIN         ;A=MAX-MIN
02EE 120A98      524                LCALL    CALCT          ;CALCULATE THRESHOLDS
02F1 EE          525                MOV      A,R6           ;
02F2 2545        526                ADD      A,AMIN         ;
02F4 F524        527                MOV      ALOW,A         ;LOW THRESHOLD
02F6 EF          528                MOV      A,R7           ;
```

```
02F7 2545      529            ADD     A,AMIN       ;
02F9 F528      530            MOV     AMIDLE,A     ;MIDDLE THRESHOLD
02FB E52F      531            MOV     A,SPARE      ;
02FD 2545      532            ADD     A,AMIN       ;
02FF F55F      533            MOV     AHIFF,A      ;MODIFIED HI THRESHOLD
0301 EC        534            MOV     A,R4         ;
0302 2545      535            ADD     A,AMIN       ;
0304 F55B      536            MOV     AHIGH,A      ;HI THRESHOLD
0306 22        537            RET                  ;
               538     ;
0307 E542      539     BHOLD: MOV     A,BMAX       ;
0309 C3        540            CLR     C            ;
030A 9546      541            SUBB    A,BMIN       ;A=MAX-MIN
030C 120A98    542            LCALL   CALCT        ;CALCULATE THRESHOLDS
030F EE        543            MOV     A,R6         ;
0310 2546      544            ADD     A,BMIN       ;
0312 F525      545            MOV     BLOW,A       ;LOW THRESHOLD
0314 EF        546            MOV     A,R7         ;
0315 2546      547            ADD     A,BMIN       ;
0317 F529      548            MOV     BMIDLE,A     ;MIDDLE THESHOLD
0319 E52F      549            MOV     A,SPARE      ;
031B 2546      550            ADD     A,BMIN       ;
031D F560      551            MOV     BHIFF,A      ;MODIFIED HI THRESHOLD
031F EC        552            MOV     A,R4         ;
0320 2546      553            ADD     A,BMIN       ;
0322 F55C      554            MOV     BHIGH,A      ;HI THRESHOLD
0324 22        555            RET                  ;
               556     ;
0325 E543      557     CHOLD: MOV     A,CMAX       ;
0327 C3        558            CLR     C            ;
0328 9547      559            SUBB    A,CMIN       ;A=MAX-MIN
032A 120A98    560            LCALL   CALCT        ;CALCULATE THRESHOLDS
032D EE        561            MOV     A,R6         ;
032E 2547      562            ADD     A,CMIN       ;
0330 F526      563            MOV     CLOW,A       ;LOW THRESHOLD
0332 EF        564            MOV     A,R7         ;
0333 2547      565            ADD     A,CMIN       ;
0335 F52A      566            MOV     CMIDLE,A     ;MIDDLE THRESHOLD
0337 E52F      567            MOV     A,SPARE      ;
0339 2547      568            ADD     A,CMIN       ;
033B F561      569            MOV     CHIFF,A      ;MODIFIED HI THRESHOLD
033D EC        570            MOV     A,R4         ;
033E 2547      571            ADD     A,CMIN       ;
0340 F55D      572            MOV     CHIGH,A      ;HI THRESHOLD
0342 22        573            RET                  ;
               574     ;
0343 E544      575     DHOLD: MOV     A,DMAX       ;
0345 C3        576            CLR     C            ;
0346 9548      577            SUBB    A,DMIN       ;A=MAX-MIN
0348 120A98    578            LCALL   CALCT        ;CALCULATE THRESHOLDS
034B EE        579            MOV     A,R6         ;
034C 2548      580            ADD     A,DMIN       ;
034E F527      581            MOV     DLOW,A       ;LOW THRESHOLD
0350 EF        582            MOV     A,R7         ;
0351 2548      583            ADD     A,DMIN       ;
0353 F52B      584            MOV     DMIDLE,A     ;MIDDLE THRESHOLD
0355 E52F      585            MOV     A,SPARE      ;
0357 2548      586            ADD     A,DMIN       ;
0359 F562      587            MOV     DHIFF,A      ;MODIFIED HI THRESHOLD
035B EC        588            MOV     A,R4         ;
035C 2548      589            ADD     A,DMIN       ;
035E F55E      590            MOV     DHIGH,A      ;HI THRESHOLD
0360 22        591            RET                  ;
               592     ;
0361 75A00F    593     STATIC: MOV    P2,#15       ;ONLY COMPARATOR BITS HI
0364 432C07    594            ORL     STATUS,#7    ;SET CALIBRATION FLAGS
               595     ;
               596     ;
               597     ;
               598     ;
               599     ;
               600     ;
```

```
                    1797        ;THE FOLLOWING SUBROUTINES ARE USED FOR CALIBRATION ONLY
                    1798        ;
0A76 75807E         1799  MAX:   MOV    P0,#12K5        ;START VOLTAGE HI
0A79 7537FE         1800        MOV    CHANGE,#-2      ;
0A7C 853DA0         1801        MOV    P2,CHANEL       ;
0A7F 853D38         1802        MOV    TSTBIT,CHANEL   ;
0A82 75240C         1803        MOV    ALOW,#12        ;
0A85 1201B4         1804        LCALL  CALBR8          ;
                    1805        ;
                    1806        ;
                    1807        ;
                    1808        ;
                    1809        ;
0A88 758002         1810        MOV    P0,#2           ;RESTART VOLTAGE LO
0A8B 753702         1811  MIN:   MOV    CHANGE,#2       ;
0A8E 753800         1812        MOV    TSTBIT,#0       ;
0A91 7524F4         1813        MOV    ALOW,#-12       ;
0A94 1201B4         1814        LCALL  CALBR8          ;
0A97 22             1815        RET                    ;
                    1816        ;
                    1817        ;
                    1818        ;
                    1819        ;
                    1820        ;
                    1821        ;
                    1822        ;
                    1823        ;
                    1824        ;THIS IS THE SUBROUTINE THAT CALCULATES THE FOUR THRESHOLD
                    1825        ;FACTORS.
                    1826        ;
0A98 F530           1827  CALCT: MOV    BUFFER,A        ;SAVE DIFFERENCE
0A9A 75F010         1828        MOV    B,#16           ;LOW THRESHOLD
0A9D 51BB           1829        ACALL  PERCNT          ;
0A9F EC             1830        MOV    A,R4            ;
0AA0 FE             1831        MOV    R6,A            ;R6=LOW FACTOR
                    1832        ;
0AA1 E530           1833        MOV    A,BUFFER        ;
0AA3 75F02E         1834        MOV    B,#46           ;MIDDLE THRESHOLD
0AA6 51BB           1835        ACALL  PERCNT          ;
0AA8 EC             1836        MOV    A,R4            ;
0AA9 FF             1837        MOV    R7,A            ;R7=MIDDLE FACTOR
                    1838        ;
0AAA E530           1839        MOV    A,BUFFER        ;
0AAC 75F044         1840        MOV    B,#68           ;MODIFIED HI THRESHOLD
0AAF 51BB           1841        ACALL  PERCNT          ;
0AB1 8C2F           1842        MOV    SPARE,R4        ;
                    1843        ;
0AB3 E530           1844        MOV    A,BUFFER        ;
0AB5 75F04A         1845        MOV    B,#74           ;HIGH THRESHOLD
0AB8 51BB           1846        ACALL  PERCNT          ;
0ABA 22             1847        RET                    ;R4=HIGH FACTOR
                    1848        ;
                    1849        ;
                    1850        ;
                    1851        ;
                    1852        ;
                    1853        ;
                    1854        ;
                    1855        ;
                    1856        ;
                    1857        ;THIS IS A 16 BIT MULTIPLY AND DIVIDE SUBROUTINE. THE
                    1858        ;OPERAND IS IN THE ACCUMULATOR AND THE PERCENT IS IN THE
                    1859        ;B REGISTER. THE ANSWER IS IN R4.
                    1860        ;
0ABB A4             1861  PERCNT: MUL   AB              ;
0ABC FD             1862         MOV   R5,A            ;LOW BYTE
0ABD AAF0           1863         MOV   R2,B            ;HIGH BYTE
0ABF 7C00           1864  DIVIDE: MOV   R4,#0           ;
                    1865        ;
```

What is claimed is:

1. A method for calibrating an electro-optical mouse, the mouse including a light-emitting means capable of outputting light of variable intensity, a light-detecting means capable of outputting a voltage signal substantially proportional to the amount of light impinging thereon, means for converting digital signals into analog reference voltage signals proportional to the numeric values represented by said digital signals, comparing means electrically connected to receive said voltage signals from said light detecting means and said reference voltage signals from said converting means, said comparing means outputting a detector signal representing one of two digital values in response to the amplitude of a voltage signal from said light-detecting means being greater than or substantially equal to the amplitude of a reference voltage signal from said converting means and outputting a detector signal representing the other of said two digital values in response to the amplitude of said voltage signal from said light-detecting means being less than the amplitude of said reference voltage signal form said converting means, and a processing means connected to receive detector signals from said comparing means and to send digital signals to said converting means, comprising the steps of
(a) activating said light-emitting means to emit light onto a surface having position-related optically contrasting indicia thereon and arranged whereby light reflected by said surface impinges on said light-detecting means;
(b) generating reference voltage signals representing a stepped ramped sequence of numeric values;
(c) stopping the stepped ramped sequence of numeric values in response to a transition of the output of said comparing means from one of said two digital values to the other of said two digital values;
(d) repeating steps (a)–(c) a plurality of times;
(e) determining the highest and lowest numeric values at which any of the stepped ramped sequences are stopped; and
(f) determining a value for said digital signals for application to said converting means by calculating at least one predetermined numeric value representing a threshold as a function of the difference between said highest and lowest numeric values.

2. The calibration method as defined in claim 1, wherein some of said plurality of stepped ramped sequences are ascending and the others of said plurality of stepped ramped sequences are descending.

3. The calibration method as defined in claim 2 wherein the ascending ramped sequences of numeric values include only steps corresponding to even integers and the descending ramped sequences of numeric values include only steps corresponding to odd integers.

4. The calibration method as defined in claim 2, wherein the ascending ramped sequences are generated successively in a first series and the descending ramped sequences are generated successively in a second series, the first ascending ramped sequence of the first series being started from a first predetermined numeric value and each succeeding ascending ramped sequence of the first series being started at a numeric value which is less than the numeric value at which the next preceding ascending ramped sequence was stopped by a predetermined difference, and the first descending ramped sequences of the second series being started from a second predetermined numeric value and each succeeding descending ramped sequence of the second series being started at a numeric value which is greater than the numeric value at which the next preceding descending ramped sequence was stopped by said predetermined difference.

5. The calibration method as defined in claim 1, further comprising the step of comparing the highest and lowest numeric values with first and second predetermined limit values respectively, said first predetermined limit value being greater than said second predetermined limit value, and adjusting the intensity of light emitted by said light-emitting means in response to said highest numeric value being greater than said first predetermined limit value or said lowest numeric value being less than said second predetermined limit value.

6. The calibration method as defined in claim 1, further comprising the step of comparing the difference between the highest and lowest numeric values with first and second predetermined limit values, said first predetermined limit value being less than said second predetermined limit value, and adjusting the intensity of light emitted by said light-emitting means in response to said difference being greater than said second predetermined limit value or less than said first predetermined limit value.

7. In an electro-optical mouse comprising a light-emitting means for outputting light of variable intensity, a light-detecting means for outputting a voltage signal substantially proportional to the amount of light impinging thereon, means for converting digital signals into analog reference voltage signals proportional to the numeric values represented by said digital signals, comparing means electrically connected to receive said voltage signals from said light-detecting means and said reference voltage signals from said converting means, said comparing means outputting a detector signal representing one of two digital values in response to the amplitude of a voltage signal from said light-detecting means being greater than or substantially equal to the amplitude of a reference voltage signal from said converting means and outputting a detector signal representing the other of said tow digital values in response to the amplitude of said voltage signal from said light-detecting means being less than the amplitude of said reference voltage signal from said converting means, and a processing means connected to receive detector signals from said comparing means and to send digital signals to said converting means said processing means comprising means for activating said light-emitting means, whereby light is emitted onto a surface having position-related optically contracting indica thereon, said surface being arranged to reflect said emitted light onto said light-detecting means, the improvement wherein said processing means further comprises means for outputting digital signals representing a plurality of stepped ramped sequence in response to a transition of the output of said comparing means from one of said two digital values to the other of said two digital values, means for determining the highest and lowest numeric values at which any of the stepped ramped sequences of said plurality are stopped, and means for calculating at least one predetermined numeric value representing a threshold as a function of the difference between said highest and lowest numeric values.

8. The improved electro-optical mouse as defined in claim 7, wherein said means for outputting digital signals representing a plurality of stepped ramped sequences is capable of outputting ascending or descending stepped ramped sequences.

9. The improved electro-optical mouse as defined in claim 8, wherein the ascending ramped sequences of numeric values include only steps corresponding to even integers and the descending ramped sequences of numeric values include only steps corresponding to odd integers.

10. The improved electro-optical mouse as defined in claim 9, wherein the ascending ramped sequences are generated successively in a first series and the descending ramped sequences are generated successively in a second series, the first ascending ramped sequence of the first series being started from a first predetermined numeric value and each succeeding ascending ramped sequence of the first series being started at a numeric value which is less than the numeric value at which the next preceding ascending ramped sequence was stopped by a predetermined difference, and the first descending ramped sequences of the second series being started from a second predetermined numeric value and each succeeding descending ramped sequence of the second series being started at a numeric value which is greater than the numeric value at which the next preceding descending ramped sequence was stopped by said predetermined difference.

11. The electro-optical mouse as defined in claim 7, further comprising means for setting the intensity level of light emitted by said light-emitting means, said setting means being connected to said processing means, said processing means further comprising means for comparing the highest and lowest numeric values with first and second predetermined limit values respectively, said first predetermined limit value being greater than said second predetermined limit value, and means for controlling said setting means for suitably adjusting the intensity of light emitted by said light-emitting means in response to said highest numeric value being greater than said first predetermined limit value or said lowest numeric value being less than said second predetermined limit value.

12. The electro-optical mouse as defined in claim 7, further comprising means for setting the intensity level of light emitted by said light-emitting means, said setting means being connected to said processing means, said processing means further comprising means for comparing the difference between the highest and lowest numeric values with first and second predetermined limit values, said first predetermined limit value being less than said second predetermined limit value, and means for controlling said setting means for suitably adjusting the intensity of light emitted by said light-emitting means in response to said difference being greater than said second predetermined limit value or less than said first predetermined limit value.

* * * * *

UNITED STATES PATENT AND TRADEMARK OFFICE
CERTIFICATE OF CORRECTION

PATENT NO. : 4,807,166

DATED : February 21, 1989

INVENTOR(S) : Thomas Zalenski

It is certified that error appears in the above-identified patent and that said Letters Patent is hereby corrected as shown below:

Column 4, line 5, change "o" to --on--.

Column 6, line 56, change "o" to --of--.

Column 8, line 11, change "t he" to --the--.

Signed and Sealed this

Twenty-third Day of February, 1993

Attest:

STEPHEN G. KUNIN

Attesting Officer

Acting Commissioner of Patents and Trademarks